United States Patent [19]
Shilton et al.

[11] 3,729,931
[45] May 1, 1973

[54] BOOSTED HYDRAULIC SYSTEMS
[75] Inventors: Brian Roger Shilton; Donald John Byron, both of Lincoln, England
[73] Assignee: Clayton Dewandre Company Limited, Lincoln, England
[22] Filed: Dec. 14, 1970
[21] Appl. No.: 97,882

[30] Foreign Application Priority Data
Dec. 19, 1969 Great Britain.....................62,006/69

[52] U.S. Cl. .............................60/54.5 P, 60/54.6 P
[51] Int. Cl...............................................F15b 7/00
[58] Field of Search ...............................60/54.506 P

[56] References Cited
UNITED STATES PATENTS
2,862,364  12/1958  Stelzer ............................60/54.5 P
3,183,670  5/1965  Schultz et al.....................60/54.5 P Primary Examiner—Martin P. Schwadron
Assistant Examiner—A. M. Zupcic
Attorney—Norris & Bateman

[57] ABSTRACT

A boosted hydraulic system for brake, clutch or similar actuation and adapted to actuate two independent load circuits comprises a manually-operable master cylinder, valve means actuated hydraulically or mechanically by movement of the master cylinder piston and controlling flow of pressurized fluid to a servo device and to one load circuit, and a supplementary hydraulic cylinder actuated mechanically by the piston of the servo device and the output of which actuates the second load circuit, the fluid delivered by the master cylinder also acting on the piston of the supplementary hydraulic cylinder but, in the event of failure of the servo device, by-passing said piston to flow directly to said second load circuit.

10 Claims, 5 Drawing Figures

INVENTORS

BRIAN ROGER SHILTON
DONALD JOHN BYRON

BY *Norris & Bateman*

NORRIS & BATEMAN

INVENTORS
BRIAN ROGER SHILTON
DONALD JOHN BYRON

BY *Norris & Bateman*
NORRIS & BATEMAN

BOOSTED HYDRAULIC SYSTEMS

This invention relates to boosted hydraulic systems for brake actuation, clutch actuation and similar purposes and provides a novel or improved booster and master cylinder unit in which the servo means magnifies the input displacement as well as the input effort whereby, in the event of failure of the servo power, the brakes or other actuated mechanism can be applied or operated without excessive pedal effort. The invention also provides a novel or improved form of dual hydraulic booster particularly applicable to the actuation of a braking system incorporating two independent sets of brakes and utilizing a power source for the direct actuation of one set of brakes and for boosting the manual actuation of the other set of brakes.

According to the invention there is provided a manually-operable master cylinder, means responsive to the pressure generated by said master cylinder or operable mechanically by the master cylinder piston and adapted to actuate valve means controlling the flow of pressure fluid to a servo device, and a supplementary hydraulic cylinder having a piston therein operable by the servo device and responsive simultaneously to the pressure generated by the master cylinder, the output of said hydraulic cylinder being used to actuate the brakes or other load, and the arrangement being such that in the event of loss of servo power, the fluid delivered by the master cylinder is caused to by-pass the piston of the said hydraulic cylinder and to flow directly to the brakes or actuated mechanism.

The power for the servo device may comprise a hydrostatic hydraulic system incorporating a reservoir, a pump, an accumulator and valve means for diverting the pressure fluid as and where required and, where the master cylinder unit controls a dual braking system, one of the sets of brakes is actuated by the full power system under control of the valve operable by the master cylinder whilst the other set of brakes is actuated by the boosted output of the master cylinder, and several embodiments of such a mechanism will now be described with reference to the accompanying drawings wherein.

Figure 1:
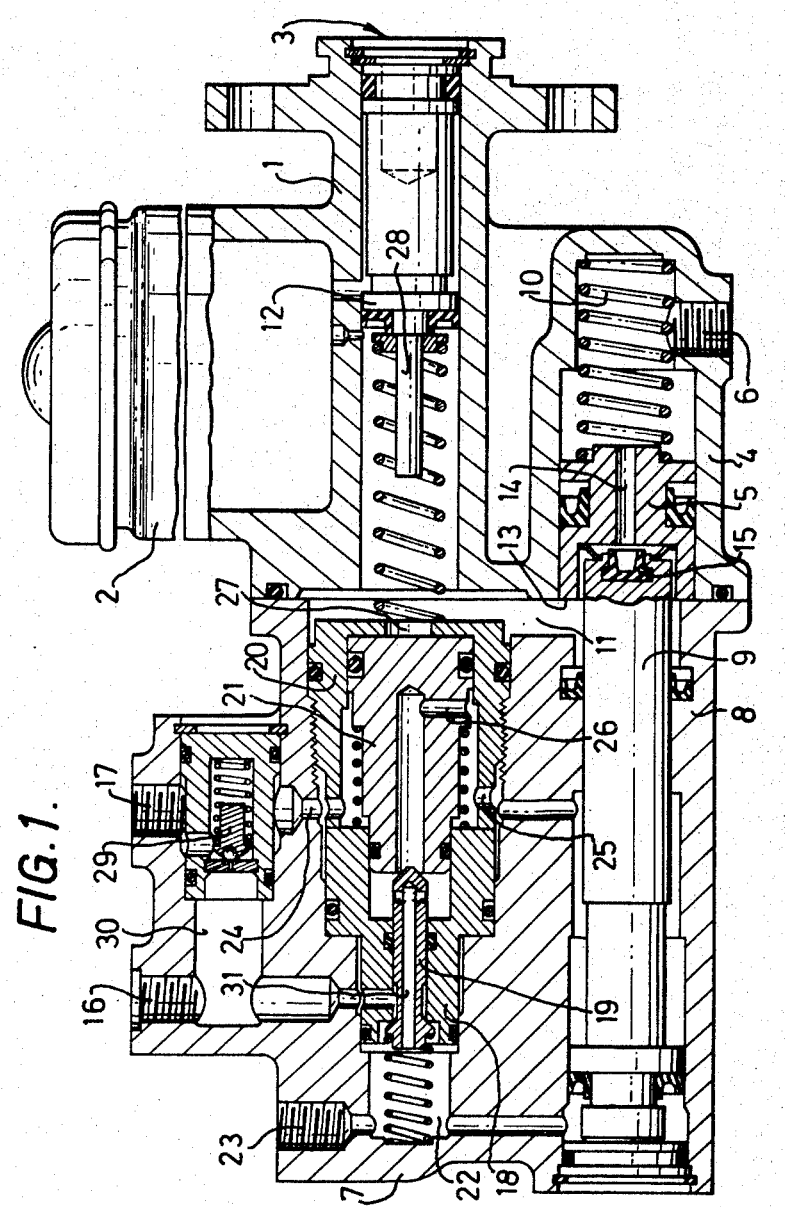
FIG. 1 is an axial sectional view of a first form of the invention.

Referring first to FIG. 1 there is shown a conventional master cylinder 1 with integral reservoir 2, said cylinder being pedal actuated through an appropriate connection at 3 and in this instance being formed integrally with a secondary or supplementary hydraulic cylinder 4 having a floating piston 5 and an output port 6 connected directly to one set of brakes, for example the front brakes of a vehicle. Secured to the dual cylinder unit is a housing 7 incorporating a servo cylinder 8, the piston 9 of which, when actuated, is caused to abut and displace the floating piston 5 against the action of its loading spring 10. A space 11 at the inner end of housing 7 constitutes a path by which fluid displaced by the piston 12 of the master cylinder also flows to an annular face 13 of the piston 5 encircling the area engaged by the servo piston 9. The piston 5 is formed with a by-pass passage 14 extending axially therethrough, this passage being closed off under normal operating conditions by a seal 15 on the end of the face of the servo piston. The servo piston 9 is adapted to be actuated by a full power hydraulic system as previously mentioned, the housing 7 having an inlet port 16 to which the fluid is delivered under pressure and a return port 17 connected to the reservoir of said system. To control the flow of pressure fluid to the servo cylinder and to a further set of brakes, for example the rear brakes of the vehicle, there is located within a chamber in the housing 7 a valve assembly comprising a tubular valve guide 18, a spring-loaded poppet valve 19 displaceable in the bore of said valve guide, a control cylinder 20 and a control piston 21 displaceable in cylinder 20 and having an axial bore cooperating with a tapered end of the poppet valve element 19. The inlet port 16 is connected by a passage in valve guide 18 with the bore of that guide, which bore opens into an antechamber 22 from which passages lead to a port 23, adapted to be connected to the second set of brakes, and to the rear end of the cylinder 8 behind the servo piston 9. Further passages 24, 25 in the housing 7 and control cylinder 20 respectively connect the return port 17 to the annular space within the cylinder 20 and surrounding the control piston 21, and which space is connected to the bore in said piston by a radial passage 26. The end wall of the control cylinder 20 is provided with a central opening 27 through which fluid displaced by actuation of the master cylinder can react on the control piston, said opening being large enough to permit the passage of a push rod 28 extending axially from the master cylinder piston 12. Finally, a spring-loaded relief valve 29 is interposed in a passage 30 interconnecting the inlet and return ports 16, 17 and the mechanism operates in the following manner.

With the powered hydraulic circuit operative, when the master cylinder is actuated, fluid displaced by its piston 12 will flow through space 11, by-pass passage 14 in piston 5 and hence to the brakes connected to port 6. When a small amount of pressure has thus been developed in the master cylinder, this pressure will react upon piston 21, through opening 27, and thus displace the control piston 21 to the left, FIG. 1. Thereby the piston 21 is caused to engage and lift the poppet valve 19 from its seating on the end of valve guide 18 so that the pressurized fluid can now flow from port 16 by way of the valve guide bore and chamber 22 to the brake connected port 23. However pressure fluid from the chamber 22 is also conducted to the rear end of the servo cylinder, displacing the servo piston into engagement with the floating piston, thus closing off by-pass passage 14 in piston 5 by the action of seal 15 in the servo piston.

Thereafter, fluid displaced by the master cylinder piston into space 11 will react on the annular face 13 of floating piston 5, augmenting the thrust applied to piston 5 by servo piston 9.

Should the master cylinder hydraulic system fail, continued movement on the brake pedal will displace master cylinder piston 12 until the push rod 28 thereon engages and displaces mechanically the control piston 21 whereby the full power system is brought into operation to actuate the set of brakes connected to port 23.

In the event of failure of the full power system, fluid displaced by the master cylinder piston 12 will flow through by-pass passage 14 in piston 5 and then directly to the brakes connected to port 6. When the manual effort is removed, master cylinder piston 12, control piston 21 and poppet valve 19 return to their initial positions under the action of their loading springs, the servo cylinder and the brakes connected to port 23 venting to the return side of the full power system by way of chamber 22, a bore 31 in the poppet valve, the bore in the control piston 21, passages 25, 26 and port 17.

Thus it will be seen that the availability of power system fluid to pressurize the servo cylinder not only reduces the manual load which must be applied to the master cylinder to achieve a desired pressure delivery from the supplementary cylinder 4, but also reduces the required movement of the master cylinder piston necessary to achieve a predetermined displacement from the supplementary cylinder.

Figure 2:
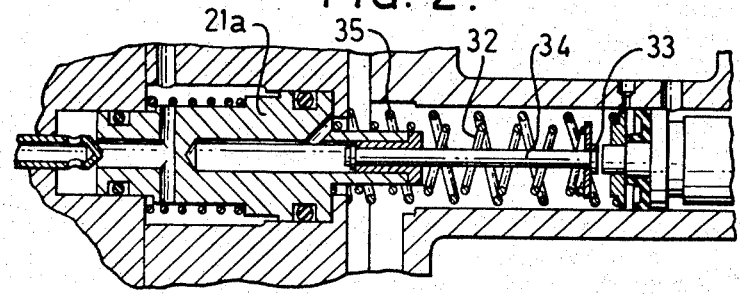
FIG. 2 is a fragmentary view showing modified means for securing a more rapid actuation of the pressure fluid control valve.

With the arrangement above described, the fact that fluid displaced by the master cylinder piston reacts on both the control piston 21 and the floating piston 5 may result in a slight delay in the actuation of the poppet valve. FIG. 2 illustrates an alternative arrangement embodying mechanical displacement of the control piston to overcome this possible defect. As shown, a preloaded captive spring 32 is located between the control piston 21a and an abutment 33 on the end of a rod 34 capable of sliding telescopically in a bore in the control piston, the abutment being normally spaced with only slight clearance from the master cylinder piston. Thus when the master cylinder is actuated and before there has been any substantial displacement of fluid therefrom, the master cylinder piston actuates the control piston mechanically through the abutment 33 and the captive spring 32 whereby a more rapid operation of the full power system, and thereby of the servo and cut-off at the floating piston, is achieved. The captive spring yields to accommodate the continued displacement of the master cylinder and is additional to the master cylinder piston loading spring 35.

Figure 3:
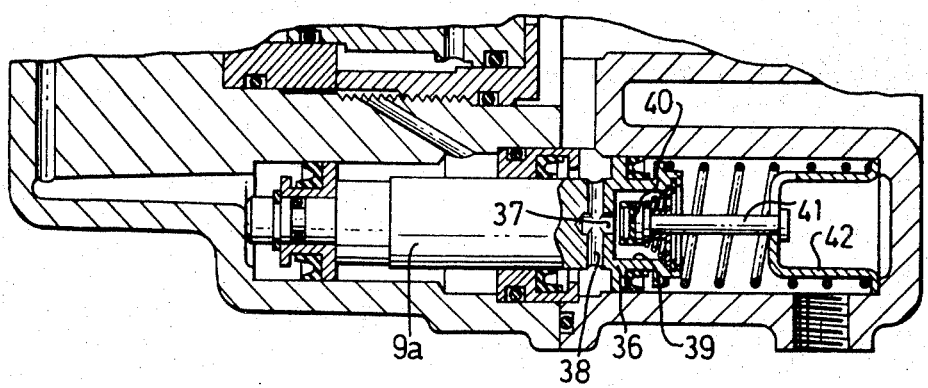
FIGS. 3-5 are further fragmentary views showing alternative constructional modifications of the supplementary cylinder servo control of FIG. 1.

FIG. 3 illustrates a modification of the embodiment according to FIG. 1 in which the floating piston of the secondary hydraulic cylinder and the servo piston are substituted by a one-piece piston element incorporating cut-off valve means for controlling flow through the by-pass passage. As shown, the equivalent of the floating piston consists of an enlargement or head 36 on the forward end of the servo piston 9a, an axial by-pass passage 37 in said piston head communicating at one end with radial passages 38 permanently connected to the output end of the manually-operable master cylinder, and at the other end with a counterbore 39 accommodating a tappet valve 40 which co-operates with an annular seating around the by-pass passage 37 and is spring-loaded onto said seating. The stem 41 of the tappet valve is supported for axial movement in a tubular guide 42 which extends inwardly from the other end of the cylinder and limits axial movement of the tappet valve in one direction, the arrangement being such as the dual piston structure approaches its backstop, that is, the limit of its movement in the direction to release the brakes, the tappet valve is arrested and the seating moves away from the valve to open up the by-pass passage. However, when the piston moves forward under servo power it contacts the valve and closes the by-pass, the valve remaining on its seating during the remainder of the piston forward travel.

Figure 4:
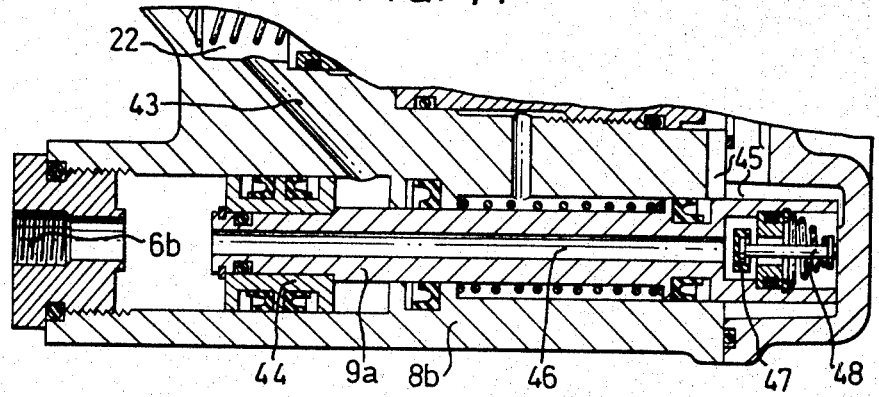

FIG. 4 illustrates another embodiment using a dual piston structure, the servo cylinder 8b in this instance being reversed in its location upon the unit such that the brake-connected port 6b is positioned at the left hand end of the housing, FIG. 4. In this construction, servo power fluid is delivered from chamber 22 through a passage 43 to the servo cylinder behind the rear face or annulus of an enlarged head 44 on the forward end of the servo piston 9b, whilst fluid displaced by the master cylinder is conducted via passages 45 to the rear end of the servo piston. The piston 9b has an axial bore 46 extending therethrough, said bore being enlarged towards its rear end to receive a spring-loaded tappet valve 47 controlling fluid flow through the bore. When the piston is on its backstop, the stem 48 of the valve abuts the end wall of the cylinder and the valve is held off its seating, thereby placing the master cylinder fluid connection in communication with the bore 46 which opens at its forward end into the supplementary hydraulic cylinder ahead of the piston. However, as soon as the piston moves forward under servo power, the valve 47 is permitted to close under its spring loading and it remains closed during the rest of the piston stroke.

Figure 5:
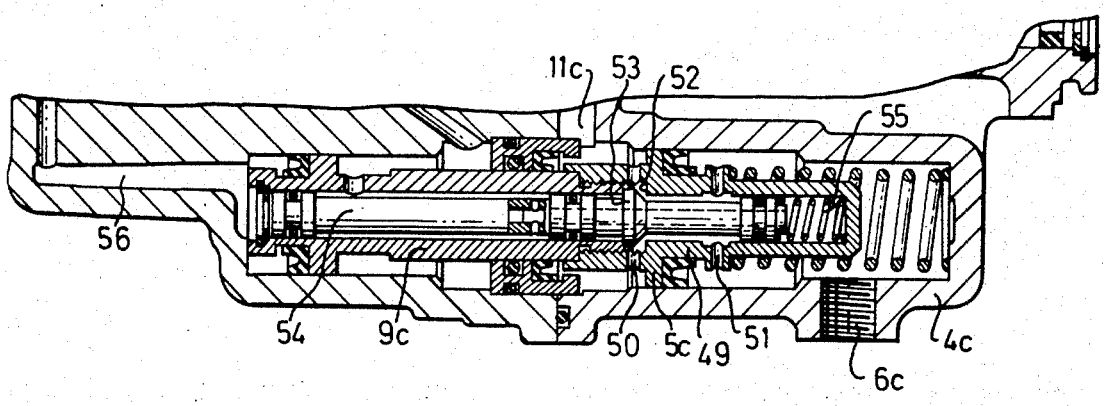

FIG. 5 illustrates another modification of the construction according to FIG. 1 devised to improve the performance of the booster at low input operating loads, this effect being achieved by closing the passage means from the master cylinder to the annular face of the secondary piston by the action of pressure fluid delivered from the power system and before said piston moves away from its "off" position. As shown, the piston 5c of the secondary hydraulic cylinder 4c is formed on a tubular fitting 49 mounted on the forward end of a hollow servo piston 9c, the interior of the fitting being permanently connected by a ring of ports 50 immediately behind the piston 5c to the passage means 11c leading from the master cylinder, and by a further ring of ports 51 in front of the piston 5c to the forward end of the cylinder 4c embodying the brake-connected port 6c. Intermediate the two rings of ports 50, 51 the fitting is formed with an annular seating 52 with which co-operates a tappet valve 53 carried on a stem 54 guided for axial movement within the bore of the servo piston which is open at its rear-end. A light spring 55 urges the tappet valve away from its seating. Thus with the servo piston in the "off" position the master cylinder is connected to port 6c by way of the two rings of ports 50, 51 and the interior of the fitting 49. However, as soon as the power system control valve is actuated, pressure fluid is delivered by way of passage 56 to the rear end of the servo cylinder. As the spring loading on the valve element 53, 54 is lighter than that on the servo piston, said element moves first to close the tappet valve 53 onto its seating 52 and close off the brake connection 6c from the master cylinder. Thereafter, the combined servo piston and secondary piston assembly moves as a unit to effect the required brake actuation.

We claim:

1. A dual hydraulic system for vehicle brake actuation comprising two sets of brakes and a separate hydraulic operating circuit for each set of brakes, means providing a full power hydraulic pressure source, a manually operable master cylinder adapted to generate hydraulic pressure independently of said source when operated, a supplementary hydraulic cylinder connected to one of said circuits for actuating one set of brakes and having a piston therein, a servo device adapted to control said piston, means including valve means connected to be operated by the hydraulic pressure generated when said master cylinder is operated to apply the brakes for operably connecting said hydraulic pressure source to the other of said circuits to actuate the other set of brakes and to also actuate said servo device to displace said supplementary piston to actuate said one set of brakes, by-pass means for supplying hydraulic pressure generated by the master cylinder directly to said one circuit in the event that there is insufficient hydraulic pressure applied to said servo device when said master cylinder is operated to apply the brakes, said by-pass means comprising a passage extending through said supplementary piston to said one circuit and seal means operable in response to normal actuation of said servo device by said hydraulic pressure source to close said passage.

2. The dual hydraulic system defined in claim 1, wherein means is provided for applying master cylinder generated pressure to said supplementary piston while said servo device is being actuated to displace said supplementary piston.

3. The dual hydraulic system defined in claim 1, wherein said master cylinder contains a movable hydraulic pressure generating piston and said valve means includes actuating means adapted to be positively operated by said master cylinder piston in the event of failure of master cylinder generated hydraulic pressure.

4. The dual hydraulic system defined in claim 1, wherein said master cylinder contains a movable hydraulic pressure generating piston and said valve means includes valve actuating means having a slidably mounted abutment adjacent said master cylinder piston and preload spring means disposed between said master cylinder piston and said abutment, whereby initial displacement of said master cylinder piston in the brake applying direction will positively actuate said valve actuating means.

5. The dual hydraulic system defined in claim 1, wherein said valve means comprises a seating element disposed in a passage connected to said source, and a control piston slidably mounted with respect to said seating element and operated in response to operation of said master cylinder to engage said element to open said valve means.

6. The dual hydraulic system defined in claim 5, wherein positive abutment means are provided on the master cylinder and control pistons for positive valve operation.

7. A dual hydraulic system as recited in claim 1, wherein said servo device includes a piston slidable with respect to the piston of the supplementary hydraulic cylinder and having an end adapted to engage and displace the piston of the supplementary hydraulic cylinder, said seal means being provided on said end of said servo piston to seal off said by-pass passage when said servo piston is engaging and displacing said supplementary cylinder piston, the hydraulic pressure generated by said master cylinder acting on an annular face of said supplementary cylinder piston surrounding the region engaged by said end of said servo piston.

8. A dual hydraulic system as recited in claim 1, wherein the servo device includes a piston which together with the piston of the supplementary hydraulic cylinder forms a dual piston structure, said by-pass passage extending through said dual piston structure, and said seal means including a valve for controlling said by-pass passage adapted to close automatically when said piston structure moves away from "brakes off" position.

9. A dual hydraulic system as claimed in claim 1, wherein the servo device includes a piston which together with the piston of the supplementary hydraulic cylinder forms a dual piston structure having an enlarged head, pressurized fluid of the servo system being directed to the rear face of said enlarged head whilst fluid displaced by the master cylinder is conducted to the front end of said supplementary hydraulic cylinder by way of said by-pass passage which extends through the dual piston structure, and said seal means including valve means co-acting with an end wall of said supplementary hydraulic cylinder and operable to close off said passage as soon as the dual piston structure moves under servo power away from the "brakes off" position.

10. A boosted hydraulic system as claimed in claim 1, wherein the servo device includes a piston which together with the piston of the secondary hydraulic cylinder forms a dual piston structure, said piston structure being hollow and providing said by-pass passage at one point by which fluid from the master cylinder is delivered to the secondary hydraulic cylinder ahead of the piston structure, and said piston structure accommodating said seal means including a tappet valve element responsive to the pressure developed in the servo system and co-acting with a seating in the piston structure to close off said by-pass passage.

* * * * *